(12) United States Patent
Braband

(10) Patent No.: US 12,705,869 B2
(45) Date of Patent: Aug. 11, 2026

(54) SUPERVISED MACHINE LEARNING OF A COMPUTER-IMPLEMENTED METHOD FOR PERFORMING A TECHNICAL PROCESS, COMPUTER PROGRAM AND A COMPUTER-READABLE STORAGE MEDIUM HAVING A COMPUTER PROGRAM FOR IMPLEMENTING THE METHOD

(71) Applicant: Siemens Mobility GmbH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 250 days.

(21) Appl. No.: 18/594,246

(22) Filed: Mar. 4, 2024

(65) Prior Publication Data

US 2024/0296664 A1 Sep. 5, 2024

(30) Foreign Application Priority Data

Mar. 3, 2023 (EP) .................................... 23159930

(51) Int. Cl.
*G06V 10/776* (2022.01)
*B61L 23/04* (2006.01)
*G06V 20/54* (2022.01)

(52) U.S. Cl.
CPC .......... *G06V 10/776* (2022.01); *B61L 23/041* (2013.01); *G06V 20/54* (2022.01)

(58) Field of Classification Search
CPC .... G06V 10/776; G06V 20/54; B61L 23/041; G06N 3/09; G06N 20/00; G05B 13/042
(Continued)

(56) References Cited

U.S. PATENT DOCUMENTS 6,195,020 B1 * 2/2001 Brodeur, Sr. ........... B61L 29/22 246/126
9,296,401 B1 * 3/2016 Palmer ................ B61L 15/0072
(Continued)

FOREIGN PATENT DOCUMENTS

DE 10 2021 200 803 A1 8/2022

OTHER PUBLICATIONS

Prechelt Lutz Ed—Lee Seong-Whan et al: "Early Stopping—ButWhen?", Sep. 27, 2015 (Sep. 27, 2015), SAT 2015 18th International Conference, Austin, TX, USA, Sep. 24-27, 2015; [Lecture Notes in Computer Science; Lect.Notes Computer], Springer, Berlin, Heidelberg, pp. 53-67, XP047254848, ISBN: 978-3-540-74549-5.

(Continued)

*Primary Examiner* — Ali Bayat
(74) *Attorney, Agent, or Firm* — Laurence A. Greenberg; Werner H. Stemer; Ralph E. Locher

(57) ABSTRACT

A supervised machine learning of a computer-implemented method performs a technical process in which a data pool is created, containing data sets with input data and output data that describes a correct process result. The data sets are divided into training and validation data sets. The method is trained in a training phase, wherein process parameters of the method are varied during repeated performances of the method. A trained method is checked in a validation phase by comparing the output data calculated with the trained method with the input data, with the output data describing the correct process result and calculating an actual probability of failure for the method as a result of the comparison. An empirical probability of failure is defined for the training phase, which is at most as large as a specified target probability of failure.

14 Claims, 3 Drawing Sheets

(58) Field of Classification Search
USPC .......................................................... 382/155
See application file for complete search history.

(56) References Cited

U.S. PATENT DOCUMENTS

| | | | | |
|---|---|---|---|---|
| 2013/0194423 | A1* | 8/2013 | Baines | B61L 23/00 348/148 |
| 2019/0232898 | A1* | 8/2019 | Hu | H04Q 9/02 |

OTHER PUBLICATIONS

Zhang Qiang et al: “Automatie Obstacle Detection Method for the Train Based on Deep Learning”, Sustainability, Bd. 15, Nr. 2, Jan. 9, 2023 (Jan. 9, 2023), Seite 1184, XP093050299, DOI: 10.3390/su15021184.

* cited by examiner

VA = z√(Pemp/nc)
Pemp
VA = z√(Pemp/n)
Pval
0
P
Pemp=s·PFD
s=1/3
Ptrue
Pe
PFD
Pec
α=0.1%
1-α=99.9%
Pval=PFD(1-α+αc)
TP
VP

SUPERVISED MACHINE LEARNING OF A COMPUTER-IMPLEMENTED METHOD FOR PERFORMING A TECHNICAL PROCESS, COMPUTER PROGRAM AND A COMPUTER-READABLE STORAGE MEDIUM HAVING A COMPUTER PROGRAM FOR IMPLEMENTING THE METHOD

CROSS-REFERENCE TO RELATED APPLICATION

This application claims the priority, under 35 U.S.C. § 119, of European Patent Application EP23159930.9, filed Mar. 3, 2023; the prior application is herewith incorporated by reference in its entirety.

FIELD AND BACKGROUND OF THE INVENTION

The present invention relates to a method for supervised machine learning of a computer-implemented method for performing a technical process and a technical system for performing a technical process. The invention also relates to a computer program and a computer-readable storage medium both of which have a program for performing said supervised machine learning.

Machine learning methods for training algorithms based on artificial intelligence are currently the focus of research. Here, machine learning successively improves the success rate in the application of the algorithm in question, wherein the success rate can be represented statistically, for example.

In the context of the present invention, artificial intelligence (hereinafter also abbreviated to AI) should be understood in the narrower sense as computer-aided machine learning (hereinafter also abbreviated to ML). This involves statistical learning of the parameterization of algorithms, preferably for very complex applications. ML enables the system to recognize and learn patterns and laws for the acquired process data based on previously input learning data. With the aid of suitable algorithms, ML can find self-contained solutions for any problems that occur. ML is divided into three fields, supervised learning, unsupervised learning and reinforcement learning, with more specific applications, for example regression and classification, structure recognitions and prediction, data generation (sampling) or autonomous action.

In supervised learning, the system is trained by the relationship between input and associated output of known data and in this way approximately learns functional relationships. This involves the availability of suitable and sufficient data, since, if the system is trained with unsuitable (for example non-representative) data, it learns incorrect functional relationships. It learns how data groups are to be formed and expanded, what is typical for the application in question and where deviations or anomalies occur. This allows applications to be described and error states to be discovered. In reinforcement learning, the system learns through trial and error by proposing solutions to given problems and receives a positive or negative assessment of this proposal through a feedback function. Depending upon the reward mechanism, the AI system learns to carry out corresponding functions.

The construction of a function f on the basis of (x1, y1), . . . , (xn, yn), here, for the sake of clarity, the example is shown for pairs of values in a two-dimensional space, to which, however, the invention is not limited, is called statistical learning. Here, the variable x denotes the input values and the variable y the output variables of the function f. This statistical learning is the basis of machine learning.

The known prior art, namely published, non-prosecuted German patent application DE 10 2021 200 803 A1, on which the invention is based, relates to supervised machine learning. Here, it is provided that the learning phase also comprises a training step on the basis of simulated measurement data generated by means of simulation on the basis of a simulation model of the technical facility and/or real measurement data generated by one or more real measurement data sources of the technical facility and a validation step which checks the quality of the learning phase.

The problem with the prior art is that applications that are relevant to safety must meet special requirements for approval. Here, it is necessary to achieve specified safety standards, although it has not yet been possible to provide suitable evidence of safety for an algorithm trained by machine learning that uses artificial intelligence so that it can optimize the safety-relevant application during operation.

The document PRECHELT LUTZ ED-LEE SEONG-WHAN ET AL: "Early Stopping—But When?", Sep. 27, 2015, SAT 2015 18TH INTERNATIONAL CONFERENCE, AUSTIN, TX, USA, Sep. 24-27, 2015; [LECTURE NOTES IN COMPUTER SCIENCE; LECT.NOTES COMPUTER], SPRINGER, BERLIN, HEIDELBERG, PAGE(S) 53-67, XP047254848, ISBN: 978-3-540-74549-5 describes a validation for recognizing an overfitting during supervised training of a neural network. The training is then stopped before the convergence ("early stopping").

SUMMARY OF THE INVENTION

Therefore, it is the object of the present invention to improve supervised machine learning in such a way that a training phase of the machine learning can be completed as reliably as possible so that a subsequent validation of the method will be successful with the highest possible probability. In particular, it is an object of the invention that a validation of the result of supervised machine learning is correct with the highest possible probability and can therefore also be used for safety-relevant technical processes, in particular during operation. Furthermore, it is an object of the invention to disclose a technical system, which is in particular accessible to machine learning if it has to be operated with high safety requirements. Finally, it is an object of the invention to disclose a computer program and a computer-readable storage medium with which supervised machine learning can be performed.

To achieve the object, the invention proposes a method for supervised machine learning (hereinafter referred to as supervised machine learning) as claimed in the independent method claim.

Accordingly, supervised machine learning of a computer-implemented method for performing a technical process is proposed in which the following steps are performed:

a) a data pool is created, containing data sets with input data for the process and output data that is assigned to the input data and describes a correct process result,
b) the data sets in the data pool are divided into training data sets and validation data sets,
c) the computer-implemented method is trained using the training data sets in a training phase, wherein process parameters of the computer-implemented method are varied during repeated performances of the method, d) the trained computer-implemented method is checked using the validation data sets in a validation phase by comparing the output data calculated with the trained computer-implemented method with the input data with the output data describing the correct process result and calculating an actual probability of failure for the computer-implemented method as a result of the comparison, e) a safety factor related to a target probability of failure for the training phase is defined, with which an empirical probability of failure is calculated, which is lower than the target probability of failure, wherein the empirical probability of failure is reduced by a confidence level compared to the target probability of failure; and f) the validation phase is initiated after it has been established in the training phase that the empirical probability of failure is not exceeded.

Here, it should be taken into account that the process result, which is described by the output data, was generated by the input data to which the process result is assigned. In other words, the process result in the form of the output data is already known in the data pool for all input data. This makes it possible to perform supervised machine learning, since supervision consists in checking whether the output data describes the correct (known) process result. According to the invention, the mathematical principles of statistical learning theory are applied here.

In order for the output data available in the data pool describing the correct process result (hereinafter referred to as the correct output data for short) and the calculated output data to be considered the same, they do not necessarily have to be identical. For example, a tolerance range can be defined for the output data, which, for example, takes into account or allows a certain degree of inaccuracy of the computer-implemented method. As long as the output data determined is within such a tolerance range, it can be considered to be consistent with the output data describing the correct process result.

The situation is, for example, different with technical processes that deal with classification problems. If the output data describes a specific class of obstacles, for example, the class described by the calculated output data, must correspond exactly to the class identified by the correct output data. Otherwise, there is a misclassification. In these simple cases, the probability of misclassification corresponds to the safety risk to be assessed in the classification problem.

A prerequisite for performing the method according to the invention is that the data in the data pool is sufficiently representative. In addition, this representative data must also be divided into training data sets and validation data sets such that these two subsets are in turn representative. This can, for example, be ensured by randomly selecting the data sets in each case for the group of training data sets or for the group of validation data sets. The data sets in the data pool can be obtained by data collection, for example by measurements in a real process or by simulating this real process. The simulation of the real process can be performed using simulation methods that are known per se. However, this is not the training phase in which the computer-implemented method is trained.

The fact that the data sets in the data pool are divided into training data sets and validation data sets means that the training data sets for the training phase and the validation data sets are only used for the validation phase. The division of data sets results in a certain ratio between the training data sets and the validation data sets (more on this below).

While the computer-implemented method can be varied in the training phase in order to optimize the performance of the associated technical process as far as possible, the method may no longer be changed during the validation phase. The training phase serves to optimize the method, while the validation phase serves to ascertain the reliability of the optimized method. In order to vary the method, parameters of the method can be changed, for example. This preferably takes place between individual performances of the method so that results of the performances of the method can be assessed in the form of the calculated output data with regard to the progress of the optimization. In particular, the calculated output data can be compared with the output data describing the correct process result, wherein the latter output data is available in the data sets. Therefore, the performance of the method should be understood as being part of the sequence of the method that can be delimited within the method such that this part enables an evaluation of the progress of the optimization. In particular, a respective performance of the method is characterized in that input data of a data set is processed within the performance of the method and calculated output data is generated within the performance of the method.

The reliability of the system is assessed on the basis of the probability of failure of the method with regard to correctly generated output data. The probability of failure must always be below a target probability of failure so that the validation of the method in the validation phase can be evaluated as successful (the application of an even stricter criterion in the form of a corrected probability of failure will be discussed in more detail below). In safety engineering, the target probability of failure is also referred to as the safety target or as the safety target or target failure measure. Failure occurs for example, in the event of a misclassification or in the event of a deviation of the calculated output data from the correct output data that exceeds the permissible tolerances.

For safety-relevant processes, it is essential that, when they are used, a specified target probability of failure has fallen below to rule out hazards. For example, for this, a probability of dangerous failure on demand (PFD) is considered when requesting the output data of the method that is required for the safety-relevant process.

According to international standard IEC 61508 or specifically for the railroad sector according to the European Norm EN 50129, four Safety Integrity Levels (SILs) are distinguished for technical processes that execute safety functions (safety). Here, Safety Integrity Level 4 represents the highest level of safety integrity and Safety Integrity Level 1 represents the lowest level of safety integrity. The respective Safety Integrity Level influences the confidence interval of a measured value to the effect that the higher the Safety Integrity Level, the lower the confidence interval is that is to be satisfied by the respective apparatus. The dimension of safety of the different Safety Integrity Levels can be clearly described with the expected frequency of failure of the safety-relevant MTBF (mean time between failures). For SIL-1, this is in the range of 10 . . . 100 a, for SIL-2 it is in the range of 100 . . . 1,000 a, for SIL-3 it is in the range of 1,000 . . . 10,000 a, and for SIL-4 it is in the range of 10,000 . . . 100,000 a.

For validation, it is furthermore important that the validation data sets are in each case only used once for validation—at least within a self-contained validation process (preferably, the validation data sets can even be deleted after one-time use, but they can be used again when a new validation process is commenced). This is the only way to ensure that the validation is statistically reliable. On the other hand, training data can in principle also be used several times within a training session for the method in question without comprising the safety requirements for the method, since this is validated afterward.

If the actual probability of failure is higher than the target probability of failure, the result of the validation is that the trained method does not meet the requirements for the reliability of the process to be performed. Therefore, the trained method can be blocked for use. Moreover, a new training phase can be initiated. If the actual probability of failure is at most as high as the target probability of failure, the validation was successful. Therefore, the trained method can be released for use.

An apparatus is computer-aided or computer-implemented if it has at least one computer or processor or a method is computer-aided or computer-implemented if at least one computer or processor executes at least one method step of the method.

A computing environment is an IT infrastructure consisting of components such as computers, memory units, programs and data to be processed with the programs, which are used to execute at least one application that has to carry out a task. The IT infrastructure can also consist of a network of the aforementioned components.

Within a computing environment, computing instances (or instances for short) form functional units, which can be assigned to applications (defined, for example, by a number of program modules) and can execute these. During the execution of the application, these functional units form physically self-contained systems (for example computers, processors) and/or virtually self-contained systems (for example program modules).

Computers are electronic devices with data processing capabilities. Computers can, for example, be clients, servers, handheld computers, communication devices and other electronic devices for data processing, which can have processors and memory units and can also be connected to a network via interfaces.

Processors can, for example, be converters, sensors for generating measurement signals or electronic circuits. A processor can be a central processing unit (CPU), a microprocessor, a microcontroller, or a digital signal processor, possibly in combination with a memory unit for storing program instructions and data. A processor can also be understood to be a virtualized processor or a soft CPU.

Memory units can be embodied as computer-readable memories in the form of random-access memories (RAM) or data memories (hard disks or data carriers).

Program modules are individual software functional units that enable a program sequence of method steps according to the invention. These software functional units can be realized in a single computer program or in several computer programs that are in communication with one another. The interfaces realized here can be implemented in terms of software within a single processor or in terms of hardware if several processors are used.

Interfaces can be hardware-based, for example wired or as a wireless connection, or software-based, for example as interaction between individual program modules of one or more computer programs.

Unless otherwise stated in the following description, the terms "create", "establish", "calculate", "generate", "configure", "modify" and the like preferably refer to processes that generate and/or change data and/or convert the data into other data. Herein, this the data is in particular available as physical quantities, for example as electrical pulses or analog electrical quantities. The necessary instructions are combined in a computer program as software. Furthermore, the terms "send", "receive", "read in", "read out", "transmit" and the like refer to the interaction of individual hardware components, in particular processors, and/or software components, in particular program modules via interfaces.

It is now significant that an empirical probability of failure, which is lower than a specified target probability of failure, is defined for the training phase, and the validation phase is initiated after it has been established in the training phase that the empirical probability of failure is not exceeded.

The method for supervised machine learning according to the invention therefore makes use of basic principles that apply to statistical learning. Since the actual probability of failure of the method to be trained is not yet known at the end of the training phase, it is uncertain whether this actual probability of failure will be higher than the specified target probability of failure and thus the validation will fail. The actual probability of failure is only determined in the validation phase. However, the prospects of success for supervised machine learning improve if a lower value is set for the empirical probability of failure than that specified by the target probability of failure. So to speak, a safety buffer is created and comes into effect if the actual probability of failure ascertained in the validation phase is higher than the empirical probability of failure, because successful validation only requires the fulfilment of the condition that the higher target probability of failure is undercut. Preferably, it is proposed that, during the training phase, performances of the method within a specified observation interval are repeatedly checked by comparing the output data calculated with the input data in the performances of the method with the output data describing the correct process result and by calculating a current probability of failure for the computer-implemented method as a result of the comparison with respect to the observation interval and the validation phase is initiated after it has been established that the calculated current probability of failure of at least one of the observation intervals does not exceed the empirical probability of failure.

The purpose of specifying an observation interval is to allow method runs to take place repeatedly in this interval. This makes it possible to check whether the empirical probability of failure is exceeded or not; for this purpose, the proportion of the method runs in which the calculated output data does not correspond to the output data describing the correct process result in the total number of method runs in the observation interval in question can be determined.

The specification of the observation interval can, for example, always include a fixed number of method runs. Another possibility is that the method runs include a variable number of method runs. In particular, it is also possible for the observation intervals to be specified such that all method runs already performed in the training phase are always taken into account. In this case, the current observation interval continues to grow, wherein the statistical safety of the assessment becomes ever greater.

The advantage of repeatedly checking compliance with the empirical probability of failure (compliance means that the calculated current probability of failure is lower than the empirical probability of failure) is that the supervision of the training phase can be performed alongside the training. As soon as the repeated check meets certain defined termination criteria for the training phase, it can be ended. This can mean that not all training data sets have been used. On the other hand, it may also mean that all training data sets have already been used once and that training is continued using the available training data sets multiple times. In addition, the condition can be set that, for the case that a termination criterion for the training phase has been reached, but not all training data sets have been used at least once, training is continued until all training data sets have been used. This will normally (but not necessarily) result in a further improvement in the performance of the computer-implemented method.

Preferably, it is proposed that the variation of the process parameters of the computer-implemented method is suppressed within the specified observation intervals.

In other words, the training data sets that lie within the observation interval are not used to vary the computer-implemented method to be trained, but are used to verify the progress already achieved by the training with regard to optimizing the method. In order to be able to assess the process parameters valid at the start of the observation interval, these are no longer changed in the last-described procedure, but are checked in the observation interval with the defined number of method runs. It is then possible to ascertain the current probability of failure in the manner already described with the highest possible statistical certainty with regard to the number of method runs taken into account.

This procedure has the advantage that the ascertainment of the current probability of failure can be clearly assigned to the method parameters valid at the start of the observation interval. Although, according to an alternative embodiment of the training phase, further variations of the process parameters within the observation interval could take place, the result of the ascertained current probability of failure is then subject to greater statistical uncertainties. Nevertheless, repeated runs through observation intervals enable a trend to be established that allows target optimization during the training phase and will ultimately lead to success. The advantage of this alternative is that more training data sets are available for training, because, during the run-through of the observation intervals, these are used simultaneously to ascertain the current probability of failure and to vary the process parameters, which is in particular advantageous when there is a low number of training data sets.

Preferably, it is proposed that a safety factor related to the target probability of failure is defined with which the empirical probability of failure is calculated, wherein the empirical probability of failure is reduced by a confidence level compared to the target probability of failure.

The consideration of the safety factor must ensure that the empirical probability of failure is lower than the target probability of failure. Therefore, the safety factor should be set as lower than 1 when multiplied by the target probability of failure. If a number greater than 1 is defined as a safety factor, this describes the (multiple) certainty that the empirical probability of failure is greater than the target probability of failure. The target probability of failure must therefore be divided by the safety factor greater than 1.

The definition of a safety factor advantageously makes it possible to obtain a measure for the improvement in the prospects of success of machine learning in order to enable a better assessment of this reliability. According to the invention, this results in a confidence level that takes into account uncertainty regarding the achievement of the desired result of the training phase. This uncertainty consists in the fact that the actual probability of failure ascertained at the end of the validation phase is higher than the empirical probability of failure achieved by the training, which cannot yet be determined with a high degree of reliably in the training phase.

Here, it should be taken into account that it is sometimes difficult to provide a large number of training data sets and validation data sets. In the case of a very large number of data sets, the prospects of success are also increased. However, if fewer data sets are available, in particular in this case, the prospects of success can be improved with the safety factor (wherein obviously the prospects of success for the training phase are improved with a large number of data sets). Training takes place by a machine learning algorithm that can be described by a function f. This must be feasible empirically, i.e., during training, with a lower empirical probability of failure than the required probability of failure taking into account the safety factor, so that machine learning can be completed successfully with a very high degree of probability.

Preferably, it is proposed that the safety factor is defined as at least ⅓ and at most ⅔, preferably ½.

Therefore, in the case of a safety factor of ½, it is, for example, de facto possible to assume half the required probability of failure PFD/2. In this case, the confidence level is likewise PFD/2. In other words, according to the invention, a safety factor is taken into account that, as a result, generates a confidence level that is taken into account when ascertaining the empirical probability of failure, wherein the sum of the safety factor and the confidence level is just 1. Obviously, this also applies to other safety factors, for example from ⅓ inclusive to ⅔ inclusive.

The use of the safety factor advantageously results in a very simple method for safeguarding the training phase, in particular with a small number of data sets, with regard to the reliability of the training result achieved. Here, according to the invention, the relationships described below are taken into account. Herein, it is assumed that the data sets are sufficiently representative for machine learning. This must be the case regardless of whether they originate from the actual performance of the technical process or the simulation of the technical process. For both the training phase and the validation phase, the division of the data sets is preferably random.

As already explained, during the training phase, an empirical probability of failure is defined in dependence on the actual probability of failure, which is not known. This dependence is preferably given by the following function of the probability of failure, which is obtained taking statistical learning theory into account.

$$P(|Pemp - Ptru| > \varepsilon) < \alpha \tag{1}$$

where

P probability of misclassification for successful training,

Pemp empirical probability of failure,

Ptrue actual probability of failure (unknown)of the trained method to be validated, ε accuracy, and α statistical significance (probability of error) for the training phase.

This formula generally provides a basis for estimating whether machine learning in the training phase is incorrectly assessed as successful. In this case, success means that the trained method remains below or equal to the target probability of failure during its performance, wherein here, it is necessary to take account of the statistical significance for the training phase. The formula makes it easy to identify that the unknown actual probability of failure may be greater than the empirical probability of failure to be ascertained, wherein the difference depends on the required accuracy. In other words, the sum of the empirical probability of failure and the required accuracy may be at most as large as the actual probability of failure (not yet known at the time of estimation). Therefore, according to the invention, it is provided that a safety factor dependent on the required accuracy is taken into account by which the empirical probability of failure to be achieved is reduced, so that, after training has been completed, the required actual probability of failure is undercut or at most achieved with very high probability. The safety factor can, for example, be at least ⅓ and at most ⅔. Preferably, the safety factor can be set at ½. With a safety factor of ½, for example, the following applies:

$$Pemp = \varepsilon = PFD/2, \tag{2}$$

wherein, here, the accuracy and empirical probability of failure are equal. In the following, a value expressing the accuracy is also referred to as the confidence level, because, as will be shown, this confidence level can be derived from the required accuracy. This means that, the lower the accuracy of the estimation (i.e., the greater ε is), the greater the confidence level must be selected.

Preferably, it is proposed that the confidence level is estimated for a given number of validation data sets as the product of a critical factor and a factor consisting of the square root of the quotient of the empirical probability of failure in the numerator and the number of validation data sets in the denominator.

In other words, the following condition must be met.

$$VA = z(Pemp/n)^{1/2} \tag{3}$$

where

VA confidence level,

Z critical factor,

Pemp critical probability of failure, and n number of validation data sets.

It can be seen that, the smaller the number of validation data sets, the greater the confidence level that must be selected. This can be explained with the requirements for the reliability of the validation result. The greater the number of validation data sets, the more reliable the result of the validation can be and the greater the probability that a resilient validation result will be obtained even with a low confidence level.

It also becomes clear that the confidence level also increases when the empirical probability of failure is increased. Namely, in other words, an increase in the empirical probability of failure means that a lower safety factor is used with a given target probability of failure. Of course, a lower safety factor also increases the risk that the actual probability of failure ascertained during the validation phase is higher than the target probability of failure.

As the above formula is an empirical formula, the critical factor z is also taken into account. This means that, the smaller the required statistical significance for the training phase, the larger the critical factor must be set. Therefore, the selection of the critical factor z indirectly takes account of the statistical significance for the training phase. Values for the critical factor z can be specified in the context of machine learning by supervising the proportion of the machine learning applications for which validation is unsuccessful in the validation phase.

Therefore, the above formula provides an easy-to-calculate criterion for assessing the confidence level. Advantageously, to calculate the required critical factor z, reference can be made to successful performances of supervised machine learning and the missing factor z calculated based on the parameters of these performances. This can then be used to enter machine learning processes that are yet to be performed with parameters that improve the prospects of success of supervised machine learning.

Preferably, it is proposed that an estimated probability of failure for a given number of validation data sets is estimated as the sum of the confidence level and the empirical probability of failure.

In other words, the following condition must be met, wherein, as can be easily seen, equation (3) can be inserted into equation (4).

$$Pe = Pemp + VA = Pemp + z(Pemp/n)^{1/2}. \tag{4}$$

Since the estimated probability of failure results from the sum of the empirical probability of failure and the confidence level, the summation can be used to quickly estimate whether the estimated probability of failure is above the target probability of failure (which then results in a critical estimated probability of failure Pec). In the context of this invention, the estimated probability of failure should be understood to be the actual probability of failure that is expected to arise under the most unfavorable conditions after completion of the supervised machine learning, which must not become critical or, in other words, must not be above the target probability of failure.

It is therefore advantageous to be able to estimate, in a simple way, by applying the above-mentioned formula, whether the supervised machine learning method in question is likely to be successfully validated or not. Accordingly, values for the estimated probability of failure that are below the target probability of failure are promising.

Preferably, it is proposed that the number of validation data sets is increased if the estimated probability of failure is above the target probability of failure.

With the measure of increasing the number of validation data sets, the specifications are shifted with regard to the above equations such that a lower confidence level results. This also reduces the estimated probability of failure.

A lower estimated probability of failure automatically increases the prospects of success for a validation of supervised machine learning for the given application. Of course, herein it must be taken into account that, increasing the number of validation data sets while the number of data sets remains the same, generally results in a reduction in the number of training data sets. Therefore, this is only possible within certain limits. It may be necessary to increase the number of data sets overall. This can take place by simulating the technical process and the computer-implemented method to be trained.

However, preferably, it can also be provided that the training data sets are released for multiple use for method runs in the training phase.

Here, it is important to know that training data sets can be used multiple times for training, wherein an optimization of an already partially trained computer-implemented method can be improved if a certain data set is used repeatedly for training. In contrast to the case with validation, this does not affect a reliable assessment of the success of learning during the validation phase.

Therefore, it is advantageously possible to make do with a limited number of data sets by using a greater proportion of the data sets as validation data sets. It is particularly advantageous for more than half the available data sets to be used as validation data sets and the rest of the data sets to be used as training data sets.

It is preferably proposed that a statistical significance of the result of the validation phase is taken into account by defining a corrected probability of failure, which is lower than the specified target probability of failure, in the validation phase for comparison with the actual probability of failure.

The corrected probability of failure therefore makes it possible to take account of a statistical significance for the validation phase, wherein the statistical significance expresses the probability that the validation of a trained computer-implemented method will take place incorrectly. This means that the validation is successful even though the actual probability of error is higher than the target probability of error.

Here, according to the invention, a circumstance is used which generally arises in the interpretation of statistical probabilities and can be used for the validation method according to the invention. According to this, the probability is to be assessed as low for the case that occurs with the statistical significance of the actual probability of failure being greater than the target probability of failure and of the actual probability of failure being greatly exceeded in relation to the target probability of failure. On the other hand, the probability should be assessed as high for the case that occurs with the statistical significance in question of the actual probability of failure being greater than the target probability of failure and of the actual probability of failure being only slightly exceeded in relation to the target probability of failure. In other words, taking account according to the invention of a lower corrected probability of failure compared to the target probability of failure means that most cases of validation errors are covered and therefore the probability of the validation being incorrectly successful is further reduced. Here, for example, values in the range between 0.9 inclusive and 1.0 (wherein 1.0 is excluded) can advantageously be selected for the correction factor c.

This knowledge according to the invention can in particular be advantageously used with safety-relevant technical processes, since, for these, very high requirements are placed on the correctness of a successful validation of a certain learned computer-implemented method. With the safety argumentation outlined above, these requirements can in particular satisfy a successful expert certification. This advantageously makes it possible to successfully approve the use of machine learning in a safety-relevant environment even under high safety requirements (approval in the sense of a positive certification), so that machine learning can also be performed in the context of ongoing safety-relevant operation without violating safety specifications.

According to the invention, violation is countered by imposing a stricter specification, namely that the actual probability of error ascertained during validation must be lower than the corrected probability of failure, even though the target probability of failure to be achieved is higher than the corrected probability of failure. This advantageously reduces the risk of false validation, since the difference formed between the target probability of failure and the corrected probability of failure so to speak forms a statistical safety buffer.

Preferably, it is proposed that the corrected probability of failure is calculated by multiplying the target probability of failure by a factor resulting from subtracting the statistical significance from 1 and adding the statistical significance multiplied by a correction factor that is less than 1.

In other words, the following condition for the corrected probability of failure must be met.

$$Pval=\alpha cPFD+(1-\alpha)PFD=PFD(1-\alpha+\alpha c) \tag{5}$$

where

Pval corrected probability of failure taking into account validation errors (misclassification), $\alpha$ statistical significance (probability of error) for the validation phase, $1-\alpha$ statistical confidence (confidence probability) for the validation phase, c constant (<1), and PFD target probability of failure.

The correction factor c is necessary in order to be able to map a dependence of the corrected probability of failure on the statistical significance. This should be set as <1 so that the corrected probability of failure is lower than the target probability of failure. To determine the correction factor, it is, for example, possible to evaluate successful applications of supervised machine learning. It is also possible for the correction factor c to be varied if it turns out that it does not generate resilient statements regarding the reliability of validations. Therefore, repeatedly applying supervised machine learning also enables the correction factor c to be "learned".

The use of the equation described above has the advantage that it provides a measure for increasing the safety of the validation phase with simple means. This can be particularly easily integrated into computer-implemented machine learning by specifying a calculation formula. The advantages explained for the preceding claim also apply accordingly to the application of this formula.

The aforementioned object is alternatively achieved according to the invention with the subject matter disclosed in the introduction (technical system) in that the system component of the technical system is configured to execute the computer-implemented method as claimed in one of the preceding claims.

The apparatus can be used to achieve the advantages that have already been explained in connection with the method described in more detail above. The statements relating to the method according to the invention also apply accordingly to the apparatus according to the invention.

Furthermore, a computer program containing program modules with program instructions for performing the aforementioned method according to the invention and/or the exemplary embodiments thereof is claimed, wherein in each case the method according to the invention and/or the exemplary embodiments thereof can be performed by means of the computer program.

Moreover, a providing apparatus for storing and/or providing the computer program is claimed. The providing apparatus is for example a memory unit that stores and/or provides the computer program. Alternatively and/or additionally, the providing apparatus is, for example, a network service, a computer system, a server system, in particular a distributed computer system, for example a cloud-based and/or virtual computer system, which stores and/or provides the computer program, preferably in the form of a data stream.

Provision takes place in the form of a program data set as a file, in particular a download file, or as a data stream, in particular a download data stream, of the computer program. However, this provision can, for example, also take place as a partial download consisting of multiple parts. Such a computer program is, for example, read into a system using the providing apparatus so that the method according to the invention is executed on a computer.

Further details of the invention are described below with reference to the drawing. Identical or corresponding elements of the drawing are in each case provided with the same reference characters and thus are only explained more than once where there are differences between the individual figures.

The exemplary embodiments explained below are preferred embodiments of the invention. In the exemplary embodiments, the described components of the embodiments in each case represent individual features of the invention that are to be considered independently of one another and which in each case also develop the invention independently of one another and thus should also be considered to be part of the invention individually or in a combination other than that shown. Furthermore, the components described can also be combined with the above-described features of the invention.

Other features which are considered as characteristic for the invention are set forth in the appended claims.

Although the invention is illustrated and described herein as embodied in a supervised machine learning of a computer-implemented method for performing a technical process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
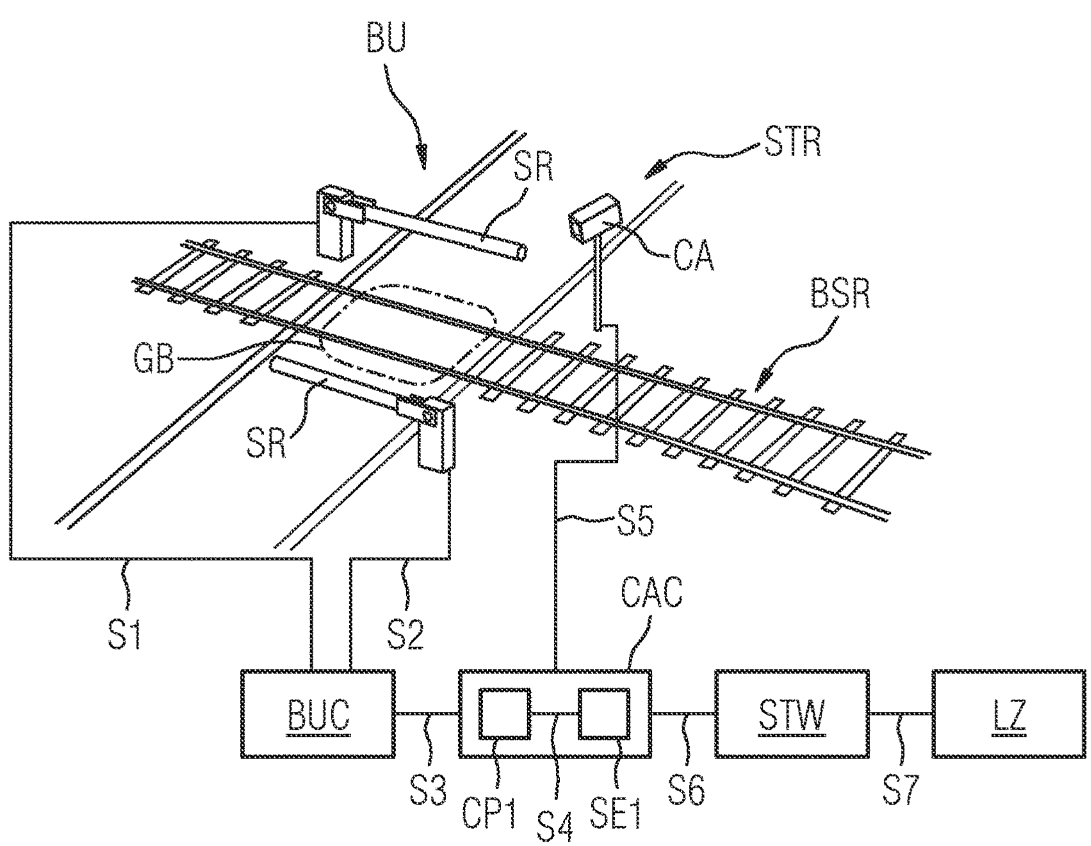
FIG. 1 is a schematic view of an exemplary embodiment of an apparatus according to the invention (technical system in the form of a railroad crossing) with its functional relationships.

Referring now to the figures of the drawings in detail and first, particularly to FIG. 1 thereof, there is shown a railroad crossing BU. In the region of the railroad crossing BU, a railroad line BSR crosses a road STR for motor vehicles. This creates a danger zone in the crossing region where a track-guided vehicle traveling on the railroad line BSR could potentially collide with obstacles on the road STR (for example vehicles or pedestrians). The railroad crossing BU is therefore demarcated by barriers SR, which are connected via a first interface S1 and a second interface S2 to a railroad crossing controller BUC.

The railroad crossing controller BUC is connected via a third interface S3 to a camera controller CAC, which is in turn connected via a fifth interface S5 to a camera CA. The railroad crossing controller BUC is in each case connected via a first interface S1 and a second interface S2 to one of two barriers SR so that they can receive and implement a close command and an open command.

The camera CA is used for optical monitoring of the danger area GB (often also called the danger zone) to enable obstacles in the danger zone GB to be recognized. To enable the camera controller CAC to perform image recognition for the purpose of recognizing obstacles, it is trained according to the invention using machine learning. For this purpose, the controller has a first computer CP1 and a first memory facility SE1 that are connected to one another via a fourth interface S4 (see also FIG. 2).

The camera controller CAC is also connected to an interlocking STW via a sixth interface S6. On the one hand, the interlocking STW is connected to a control center LZ via a seventh interface. Therefore, the railroad crossing controller BUC, chamber controller CMC, interlocking STW and control center LZ form a network, which, as a technical system TS (see FIG. 2) of a railroad system, in the present case comprises the railroad crossing BU and further infrastructure components of the railroad system (not depicted in FIG. 1).

Figure 2:
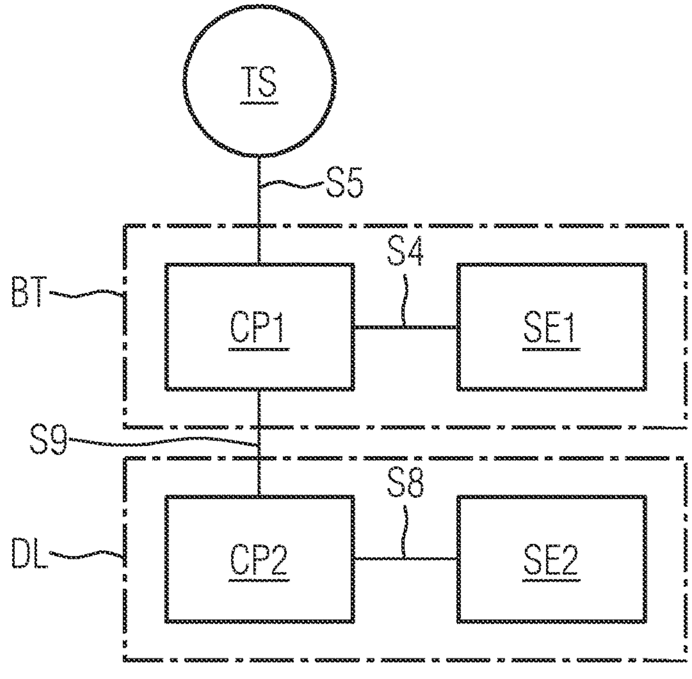
FIG. 2 is a block diagram of an exemplary embodiment of a computing environment for the apparatus according to FIG. 1, wherein the individual computing instances execute program modules which can in each case run in one or more of the computers depicted by way of example and wherein the interfaces shown can accordingly be implemented in terms of software in a computer or in terms of hardware between different computers.

FIG. 2 depicts a computer infrastructure that can be assigned to an operator BT on the one hand and to a service provider DL on the other. The operator BT and the service provider DL can communicate with one another via a ninth interface connecting the first computer CP1 to a second computer C2. The second computer C2 is moreover connected via an eighth interface to a second memory facility SE2. The first computer CP1, which is assigned to the operator BT, communicates via the fifth interface S5 with the technical system TS, which is representatively indicated by the camera CA in FIG. 1, but, as already explained, can also contain further components of the railroad infrastructure.

Figure 3:
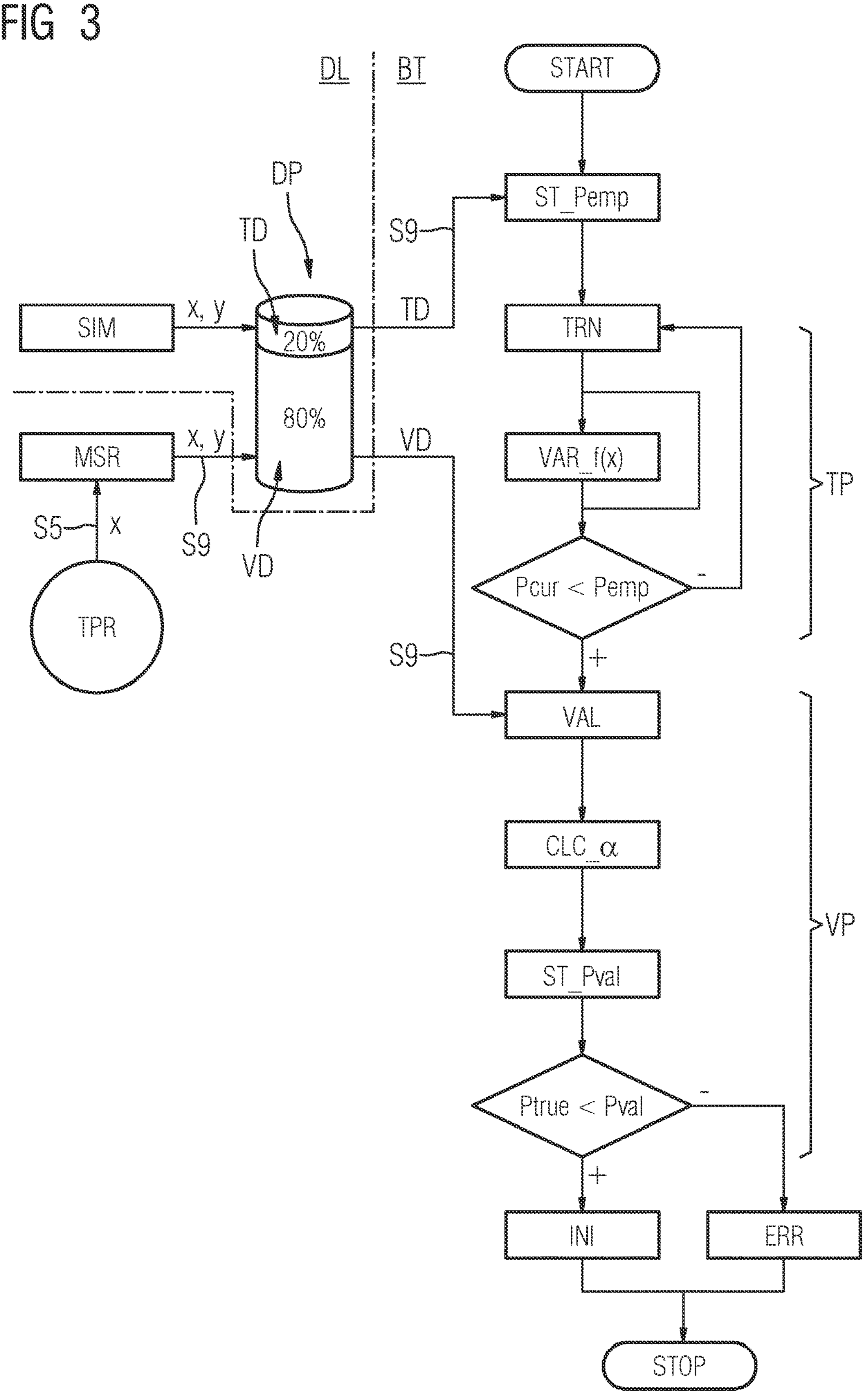
FIG. 3 is a flow diagram of an exemplary embodiment of the method according to the invention, wherein the individual method steps can be realized individually or in groups by program modules and wherein the computing instances and interfaces according to FIG. 2 are indicated by way of example.

The computer-implemented method for performing the technical process TPR can be performed as depicted in FIG. 3, wherein output variables y resulting from the associated input variables x can be ascertained by measurements in a measuring step MSR, for example. As an alternative to performing the technical process TPR in reality, this technical process TPR can also be simulated in a simulation step SIM, wherein the output variables y that would result from the performance of the process are calculated by simulation for the input variables x.

The data sets x;y, which in each case result from the input variables x and the output variables y, are stored in a data pool DP. In a step that is not depicted in detail in FIG. 3, the data sets x;y are in each case divided into training data sets TD and validation data sets VD. This can, for example, take place by using a random generator. Herein, the ratio for the division of the data sets x;y is specified. In the example according to FIG. 3, 20% training data sets TD and 80% validation data sets VD are to be created.

In FIG. 3, the simulation step SIM and the division of the data sets x;y in the data pool DP into training data sets TD and validation data sets VD are carried out by the service provider DL. This is indicated by a dash-dot dividing line. In contrast, the measuring step MSR and the machine learning, consisting of the training phase TP and the validation phase VP, are carried out by the operator BT.

If the data pool DP is available with a sufficient number n of data sets x;y, the machine learning method is started, followed by a training phase TP of the method according to the invention. In a training step TRN, the method an algorithm is trained by a repeated variation step VAR_f(x) and the algorithm is defined after training is complete. This is followed by a first query step Pour<Pemp to determine whether the result of the algorithm for the input variable x in question produces the output variable y stored in the data pool DP (possibly taking account of a tolerance range that defines a permissible deviation of the stored output variable y from the algorithm calculated by means of the algorithm), wherein only training data is used for this. If this is the case, the training phase TP is completed.

The training phase TP is followed by a validation phase VP. The following steps are run through in the validation phase VP. In a determination step CLC_α, the statistical significance α is defined. This is followed by a determination step CLC_α in which a corrected probability of failure Pval is ascertained. The corrected probability of failure Pval takes into account the defined statistical significance α with regard to failure, i.e., an incorrect result of the validation phase VP. In a second query step Ptru<Pval, a check is performed as to whether the actual probability of failure Ptrue is lower than the corrected probability of failure Pval. If the result of this query is positive, the machine-learned algorithm is subsequently released and introduced in an initialization step INI for subsequent use in the technical process TPR in question. However, if the second query step Ptru<Pval leads to a negative result, an error message is output in an output step ERR. In both cases, the entire machine learning process is then terminated.

Figure 4:
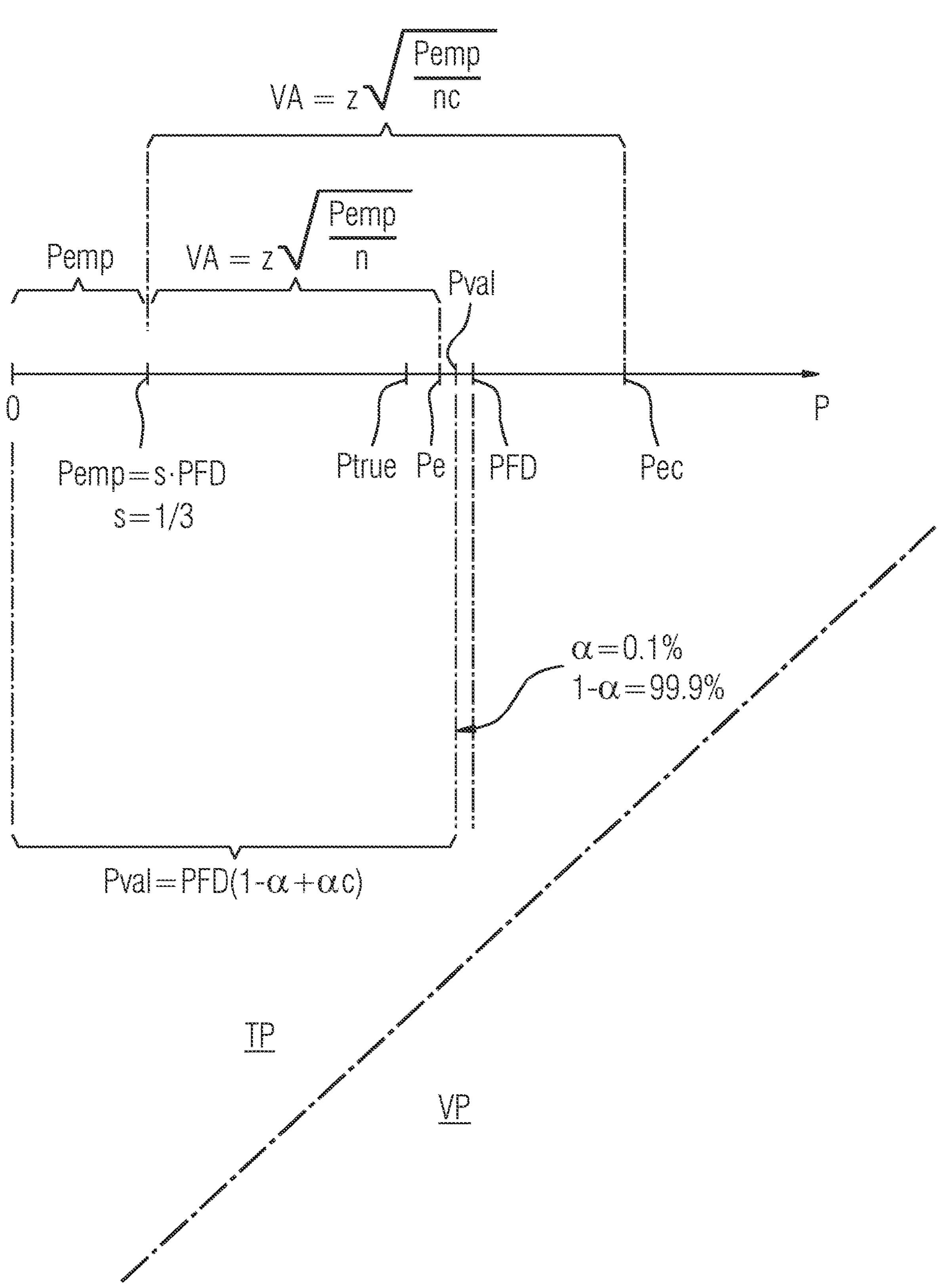
FIG. 4 is an example of the algorithms used to calculate or estimate different probabilities depicted on a probability beam P.

FIG. 4 is a schematic depiction of the relationships between the individual calculated probabilities and actual probabilities that are relevant for the machine learning method according to the invention using a beam representing probability (hereinafter referred to as the probability beam). Furthermore, a dash-dot line indicates which part of the schematic depiction relates to the training phase TP and which part of the schematic depiction relates to the validation phase VP.

If machine learning begins with the training phase TP, the validation phase VP still has to be performed. However, special features associated with the statistical uncertainty connected with the validation phase VP should already be taken into account in the training phase TP. For this purpose, two stages are used to effectively protect the safety of machine learning against failure. These two stages increase safety against failure independently of one another.

Due to the safety relevance of the technical process TPR for which an algorithm is to be trained by means machine learning, a target probability of failure PFD is specified which results from the particular circumstances of the technical system TS and the operation thereof. After completion of the machine learning training phase TP, this target probability of failure PFD must be strictly adhered to, wherein this indicates how high the probability of failure on demand is for the algorithm in the technical system TS when performing the technical process TPR.

In order to safely ensure that the algorithm trained in the training phase TP will successfully run through the validation phase VP with a limited number n of training data sets TD, in a first stage, an empirical probability of failure Pemp is defined, which, in the example according to FIG. 4, is a certainty s=⅓ (also called safety factor) at a third of the target probability of failure PFD. Once the empirical probability of failure Pemp has been defined, a confidence level VA, which results statistically in relation to a given number n of validation data sets VD can be estimated taking a critical factor z into account as follows:

$$VA = z(Pemp/n)^{1/2}. \tag{3}$$

The sum of the empirical probability of failure Pemp and the confidence level VA produces an estimated probability Pe, which in principle must be below the target probability of failure PFD, as depicted in FIG. 4. As already mentioned, this depends on the number n of validation data sets VD. FIG. 4 also depicts this for a critical number nc of validation data sets VD for which a critical estimated probability Pec results that is above the target probability of failure PFD. The response to this can be to further reduce the empirical probability of failure Pemp. Another possibility is to increase the number n of validation data sets VD, wherein this leads to a reduction in the training data sets TD and can therefore only be performed with certain limits. Therefore, a further alternative is to generate additional data sets x;y by additional measurements or simulations so that a larger quantity of data sets x;y is available and therefore the number n of validation data sets VD can also be increased.

As already described, the validation phase VP should be performed after the training phase TP. This serves to validate the trained algorithm, wherein here the available validation data sets VD are used. For each of this number n of data sets x;y, the algorithm is performed with the associated input data in a validation step and the result is compared with the target result stored in the validation data set VD (here, this is the output data). The sum of all validation steps that corresponds to the number n of validation data sets VD, forms a validation run. The actual probability of failure Ptrue can be calculated directly from the ratio of the number of validation steps nfail in which the algorithm failed to the total number (number n) of validation steps as:

$$Pkrit = n\,\text{fail}/n.$$

The validation process, which is run through in the validation phase VP (validation run), is also subject to statistical uncertainty, which can be described with the statistical significance α. If the machine learning method is to be certified for safety-critical applications, this statistical uncertainty must be taken into account during the performance of machine learning. This takes place by determining a corrected probability of failure Pval, which must be used as the basis for the validation method in the second stage. For the validation, it is required that this corrected probability of failure Pval must be used as the basis for the validation, i.e., for the determination of the actual probability of failure Ptrue. The resulting corrected probability of failure Pval is:

$$Pval = \alpha cPFD + (1-\alpha)PFD = PFD(1-\alpha+\alpha c). \quad (5)$$

It should be noted that the first stage and the second stage are performed independently of one another. This means in particular that the target probability of failure PFD can be used as the basis for assessing whether the empirical probability of failure Pemp is sufficient for the given number n of validation data sets VD, but independently of this, a lower corrected probability of failure Pval is used as the basis for the validation taking into account the statistical significance α, which must not be exceeded by the actual probability of failure Ptrue.

The following is a summary list of reference numerals and the corresponding structure used in the above description of the invention.

LIST OF REFERENCE CHARACTERS

BI Observation interval
BSR Railroad line
BT Operator
BU Railroad crossing
BUC Railroad crossing controller
c Correction factor
C2 Second computer
CA Camera
CAC Camera controller
CLC_α Determination step
CP1 First computer
DL Service provider
DP Data pool
ERR Output step
GB Danger area
INI Initialization step
LZ Control center
MSR Measuring step
n Number
nc Critical number
nfail Number of validation steps
Pc Critical probability of failure
Pcur Current probability of failure
Pcur<Pemp First query step
Pe Estimated probability
Pec Critical estimated probability
Pemp Empirical probability of failure
PFD Target probability of failure
Ptru<Pval Second query step
Ptrue Actual probability of failure
Pval Corrected probability of failure
S Safety factor
S1. . . . S9 Interface
SE1 First memory facility
SE2 Second memory facility
SIM simulation step
SR Barrier
STR Road
STW Interlocking
TD Training data sets
TP Training phase
TPR Technical process
TRN Training step
TS Technical system
VA Confidence level
VAR_f(x) Variation step
VD Validation data sets
VP Validation phase
x Input variable
x;y Data sets
y Output variable
Z Critical factor
α Statistical significance

The invention claimed is:

1. A supervised machine learning of a computer-implemented method for performing a technical process in which output variables of the technical process resulting from input variables can be ascertained, the method comprises the following steps of:

a) creating a data pool, containing data sets with input data for the technical process and output data that is assigned to the input data and describes a correct process result;

b) dividing the data sets in the data pool into training data sets and validation data sets;

c) training the computer-implemented method using the training data sets in a training phase, wherein process parameters of the computer-implemented method are varied during repeated performances of the computer-implemented method;

d) checking a trained computer-implemented method using the validation data sets in a validation phase by comparing the output data calculated with the trained computer-implemented method with the input data, with the output data describing the correct process result and calculating an actual probability of failure for the computer-implemented method as a result of a comparison;

e) defining a safety factor related to a target probability of failure for the training phase, with which an empirical probability of failure is calculated, which is lower than the target probability of failure, wherein the empirical probability of failure is reduced by a confidence level compared to the target probability of failure; and f) initiating the validation phase after it has been established in the training phase that the empirical probability of failure is not exceeded.

2. The supervised machine learning according to claim 1, wherein:

during the training phase, performances of the computer-implemented method within a predetermined observation interval are repeatedly checked by comparing the output data calculated with the input data in the performances of the computer-implemented method with the output data describing the correct process result and by calculating a current probability of failure for the computer-implemented method as a result of the comparison with respect to the predetermined observation interval; and initiating the validation phase after it has been established that the current probability of failure of at least one said predetermined observation interval does not exceed the empirical probability of failure.

3. The supervised machine learning according to claim 2, which further comprises suppressing a variation of the process parameters of the computer-implemented method within the predetermined observation intervals.

4. The supervised machine learning according to claim 1, wherein the safety factor is defined as at least ⅓ and at most ⅔.

5. The supervised machine learning according to claim 4, wherein the safety factor is defined as ½.

6. The supervised machine learning according to claim 1, which further comprises estimating the confidence level for a given number of the validation data sets as a product of a critical factor and a factor consisting of a square root of a quotient of the empirical probability of failure in a numerator and a number of the validation data sets in a denominator.

7. The supervised machine learning according to claim 6, which further comprises calculating an estimated probability of failure for the given number of the validation data sets as a sum of the confidence level and the empirical probability of failure.

8. The supervised machine learning according to claim 7, which further comprises increasing the number of the validation data sets if a calculated estimated probability of failure is above the target probability of failure.

9. The supervised machine learning according to claim 1, wherein the training data sets are released for multiple use for method runs in the training phase.

10. The supervised machine learning according to claim 1, which further comprises taking into account a statistical significance of a result of the validation phase by defining a corrected probability of failure, which is lower than the target probability of failure, in the validation phase for comparison with an actual probability of failure.

11. The supervised machine learning according to claim 10, which further comprises calculating the corrected probability of failure by multiplying the target probability of failure by a factor resulting from subtracting the statistical significance from 1 and adding the statistical significance multiplied by a correction factor which is less than 1.

12. A technical system for performing a technical process, the technical system comprising:

a system component having a computer, said system component of the technical system is configured to execute the computer-implemented method according to claim 1.

13. The technical system according to claim 12, wherein the technical system is a railroad technical installation being a railroad crossing, wherein the computer-implemented method is configured at said railroad crossing to perform obstacle detection in a danger zone of said railroad crossing.

14. A non-transitory computer-readable storage medium having computer-executable instructions for performing the computer-implemented method according to claim 1.

* * * * *